United States Patent [19]

Lindsey et al.

[11] Patent Number: 4,944,606
[45] Date of Patent: Jul. 31, 1990

[54] PRECISION MOTION SLIDEWAYS

[75] Inventors: Kevin Lindsey, Middlesex; Stuart T. Smith, Bedfordshire, both of England

[73] Assignee: The Secretary of State for Trade and Industry in Her Britannic Majesty's Government of the United Kingdom of Great Britain and Northern Ireland, London, England

[21] Appl. No.: 405,938

[22] Filed: Aug. 7, 1989

[30] Foreign Application Priority Data

Apr. 16, 1987 [WO] PCT Int'l Appl. ............... PCT/GB88/00296
Apr. 16, 1987 [GB] United Kingdom ............... 8709290

[51] Int. Cl.$^5$ ..................... F16C 33/20; F16C 33/14
[52] U.S. Cl. ........................... 384/42; 29/898.047; 384/26; 384/37
[58] Field of Search .............. 384/7, 10, 26, 37, 42, 384/908; 29/149.5 R, 149.55

[56] References Cited

U.S. PATENT DOCUMENTS

| | | | |
|---|---|---|---|
| 3,115,696 | 12/1963 | Evans | 29/149.5 |
| 3,443,461 | 5/1969 | De Biasse | 384/37 X |
| 3,582,157 | 6/1971 | Hammon . | |
| 4,060,291 | 11/1977 | Seybold | 384/42 |
| 4,114,945 | 9/1978 | Lutz | 384/37 X |
| 4,738,081 | 4/1988 | Tisma | 384/42 X |
| 4,773,769 | 9/1988 | Church | 384/42 |

OTHER PUBLICATIONS

Konstruktion, vol. 31, No. 10, 1979, Springer-Verlay (Berlin, DE), R. Seybold: "Geradfuhrungen mit dynamischer Schmierung-ein Beitrag zur Gestaltung (cont.) und Aus legung von Geradfuhrungen", pp. 399-403.
Patent Abstracts of Japan, vol. 8, No. 182 (M-319) (1619), Aug. 22, 1984, & JP, A, 5973622 (Nobuyuki Tsuboi) Apr. 25, 1984.

Primary Examiner—Thomas R. Hannon
Attorney, Agent, or Firm—Nixon & Vanderhye

[57] ABSTRACT

A plain bearing slide system has a carriage mounted on a slide by use of bearing pads. Each bearing pad is coated with a layer of polymeric material having a convex surface, and is arranged to ride on a counterface. The combined thickness of the layer and a layer providing the counterface is such that the difference between the static and dynamic coefficients of friction is substantially less than the difference associated with the material when used in bulk bearings. A slide system using PTFE, and with a combined thickness of the layers of 2 to 3 micrometers, operated as a measuring instrument under ambient conditions such that the PTFE is substantially non-eroding, has proved capable of providing measurements to an accuracy of 0.05 nanometers.

32 Claims, 6 Drawing Sheets

DIRECTION OF MOTION

PRECISION MOTION SLIDEWAYS

The present invention relates to precision motion slideways for use in machines and instruments requiring smooth motion with an accuracy of the order of better than 5 nanometers.

Examples of modern technology requiring this order of accuracy are in the manufacture of optical and electronic components. Many of these components are required to have a surface texture exhibiting minimal roughness, and in fact to have surfaces smooth to almost atomic level. There is therefore a requirement for instruments to be able to measure texture to this level.

In a known instrument test pieces are static and a sensor, mounted on a strip spring arm, is moved over its surface. This can give readings to an accuracy of 0.05 nanometers, by unfortunately the sensor moves along an arc of a circle. Due to the geometry of the mechanism accuracy can be maintained only over relatively small arcs. Also it is in many instances a necessity that measurements be made linearly.

Instruments are also known which do operate in a straight line manner but these are mounted on precision roller races or on bulk polytetrafluoroethylene (PTFE) bearings, and have an accuracy of only 10 to 20 nanometers.

It is well known that the static and dynamic coefficients of friction between two surfaces differ. The Applicant has discovered that for certain materials, when two surfaces of the substance are in sliding contact, the difference between the static and dynamic coefficients of friction decreases as the combined thickness of the two surface layers decreases below a certain level. Also, as this difference decreases so do the fluctuations in the dynamic coefficient of friction. In this specification the coefficients of friction during conventional use of the materials will be referred to as the bulk coefficients, whilst the coefficients of friction between thin layers such that the difference between them is reduced will be referred to as the thin layer coefficients.

The Applicant has also discovered that in a sliding system the motion accuracy (that is, the stability in a direction perpendicular to the plane of motion) and the "quietness" of motion (the constancy of forces generated by friction in the system) are related.

As a result of these discoveries the Applicant has been able to design an instrument capable of providing an accuracy of the order of 0.05 nanometers.

According to the present invention a plain bearing slide system includes a carriage mounted on a slide, the carriage being kinematically constrainable to move along an accurately defined path by means including bearing pads between the carriage and the slide, characterised in that the surface of each bearing pad is of convex shape, is coated with a thin layer of substantially non-eroding polymeric material having a convex surface, and is arranged to ride along a counterface in the form of a face of a thin layer of substantially non-eroding polymeric material, the combined thickness of the two layers of substantially non-eroding material being such that the difference between the static and dynamic coefficients of friction is considerably less than the difference between the static and dynamic bulk coefficients of friction and that the fluctuation in dynamic coefficient of friction is correspondingly reduced.

The convex surfaces are preferably spherical by may be, for example, ellipsoidal or paraboloidal. The bearing pads are preferably secured to the carriage.

The non-erosive material may be PTFE, in which case the combined thickness of the layers should be such that the difference between the static and dynamic coefficients of friction is no more than 5% (about 25% of the difference between the bulk coefficients). The combined thickness is preferably not greater than between 2 and 3 micrometers, and the radius of curvature of the bearing surfaces is preferably in the range 500 to 50 millimeters.

Other suitable materials might be, for example, high density polyethylene (HDPE) or ultra high molecular weight polyethylene (UHMWPE).

One form of slide system has five pads, the accurately defined path then being a straight line. The carriage preferably has a center of friction at, or acting along a line through which, a force can be applied parallel to the accurately defined path in order to move the carriage.

The system is preferably such that when a test piece is mounted on the carriage the centre of gravity and inertia of carriage and test piece coincide with the centre of friction. Where test pieces all have the same physical characteristics this can be arranged by adjustment of the weight of the carriage, otherwise the carriage can be designed for the addition of weights so that the combined weight and inertia of carriage and test piece can be adjusted.

The thin layer of material on the slide is preferably deposited from material on the pads by a running in or pre-preparation method.

According to another aspect of the invention a process of constructing a plain bearing slide system having a carriage mounted on a slide, the carriage being kinematically constrainable to move along an accurately defined path by means including bearing pads between the carriage and the slide, the surface of each bearing pad being of convex shape and coated with a thin layer of substantially non-eroding polymeric material, each bearing pad being arranged to ride along a counterface in the form of a surface of a thin layer of non-eroding polymeric material, is characterised in including the steps of;

selecting a polymeric substance which, at the planned operating conditions of the slide system, has a thin layer difference of static and dynamic coefficients of friction substantially less than the bulk difference and a correspondingly reduced fluctuation in dynamic coefficient of friction, and which is capable of providing a counterface having a roughness no greater than 5 nanometers Ra;

determining a combined thickness of the thin layers which gives a reduced difference in coefficients of friction and a reduced fluctuation in dynamic coefficient of friction appropriate to the required accuracy of the instrument;

establishing limits of radius of curvature of a surface of the thin layer of each bearing pad within which, in use, any variation of interface contact position or area and any inadequacy in averaging out geometrical imperfections are not too great to prevent the required accuracy from being attained, and within which interface stress remains within acceptable limits;

constructing the bearing pads, assembling the carriage, slide and bearing pads and adding the counterface for each bearing pad such that the combined thickness of the thin layers is no greater than that which has been determined to give coefficient of friction characteristics appropriate to the desired accuracy.

The pads may have a plain convex surface, or may be modulated to have a plurality of projections, all the projections having convex surfaces preferably of a common radius. The projections are preferably cylindrical in shape, but may be square, rectangular or any other convenient shape.

Some embodiments of the invention will now be described, by way of example only, with reference to the accompanying diagrammatic drawings of which:

FIGS. 3 (a and b), 4 (a and b), 5 (a and b) and 6 (a and b) are similar elevation (a) and plan (b) views of alternative carriage and slide combinations;

A carriage and slide assembly (FIGS. 1, 2) has a carriage 10 mounted on a prismatic form slide 11 having a groove 12 in which a contact member 13, integral with and situated at the center of gravity and inertial of the carriage 10, travels freely.

The carriage 10 rides on the slide 11 which it contacts through five kinematically disposed bearing pads 14 so positioned that the center of friction lies along the contact member 13. (The positions which the bearing pads 14 take up on the slide 11 are shown in plan view at 15 on FIG. 2).

Each bearing pad 14 (FIG. 7) has a stiff backing member 20 having a convex backing surface 21 on which is deposited a thin layer 22, of polymeric material such as PTFE, HDPE, or UHMWPE, having a bearing surface 24.

In use the carriage 10 is moved relative to the slide 11 by means of a motive force (not shown) applied to the contact member 13, and as a result some polymeric material is transferred from the layer 22 to the face of the slide 11 to provide a counterface 25 in the form of a surface of a thin layer 23 (FIG. 7) of the material. This system rapidly stabilises after which there is no significant interchange or removal of polymeric material. The assembly can then be used for measuring a specimen (not shown) placed on the carriage and moved relative to a measuring device (not shown) such as a fine diamond tipped stylus, laser beam, etc. Testing methods, and various measuring methods are well known in the art, form no part of the present invention and will not be discussed further.

Figure 7:
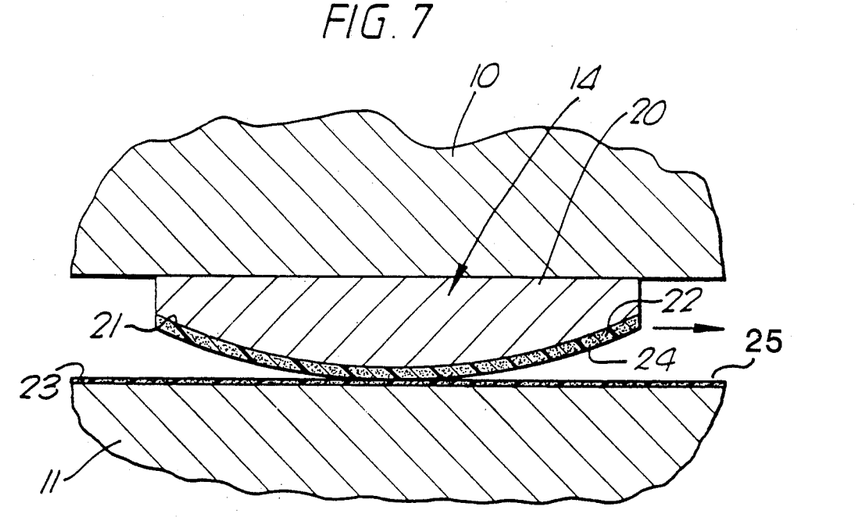
FIG. 7 is an elevation, in section, of a bearing pad according to the invention.

In practice elastic deformation of the interface between the layer 22 and thin layer 23 on the slide 11 produces a contact area which averages out slide imperfections and reduces interface stresses.

In an instrument as described above with reference to FIGS. 1 and 2 bearing pads 14 as described above with reference to FIG. 7 were formed from a plate sheet of material having a thin steel backing 20 on which was bonded a porous bronze surface 21, a PTFE based material being bonded on to the porous bronze to form a layer 22. The material was pressed between an accurately formed hard spherical male former and a plastic (nylon or polypropylene) female former to provide a convex circular surface of 5 mm diameter having a radius of curvature slightly smaller than was required. The surface 24 of the layer 22 was then machined to a radius of approximately 300 millimeters (slightly greater than the radius of the steel backing 20 and porous bronze surface 21) and thickness of 2 to 3 micrometers at the point of contact, using a concave glass file formed by standard optical workshop techniques.

It was found that, after counterfaces 25 had been established on the slide 11 the combined thicknesses of the layers 22 and associated counterface layers 23 was 2 to 3 micrometers, and the instrument would work to an accuracy of 0.05 nanometers. The instrument was thermally and mechanically stable and would therefore work to this accuracy over a long period of time.

Figure 9:
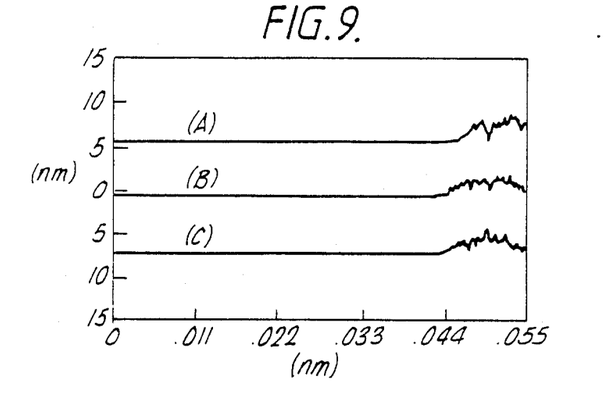
FIGS. 9 to 12 are records of measurements made using a slide system according to the invention.

Records obtained using the instrument are shown in FIGS. 9 to 12. FIG. 9 shows start up of the instrument after a stylus had been allowed to stand on a polished specimen of silicon carbide for 6 minutes (Trace A), 10 minutes (Trace B) and 15 minutes (Trace C) respectively. It can be seen that there is a transitional rise of no more than 1.5 nanometers. The rise is due partly to specimen indentation and partly to slide start up characteristics.

Figure 10A:
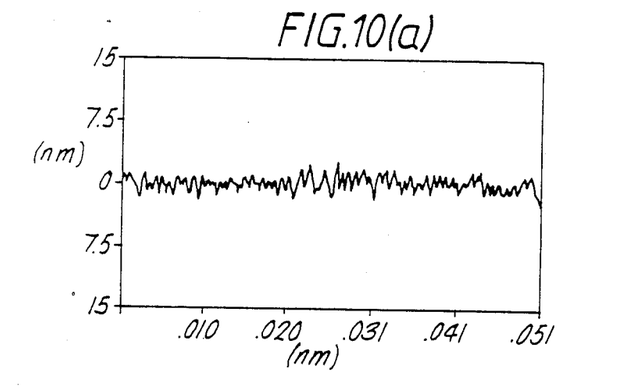
Figure 10B:
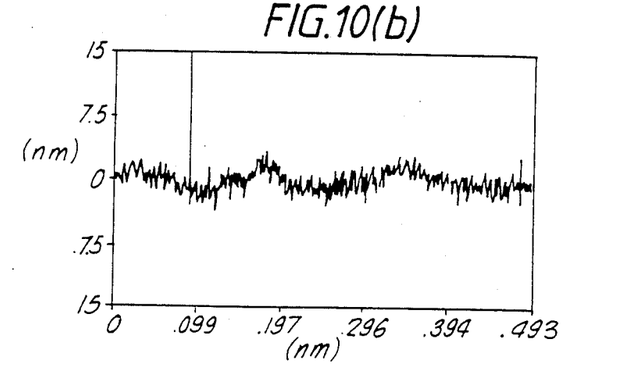
Figure 10C:
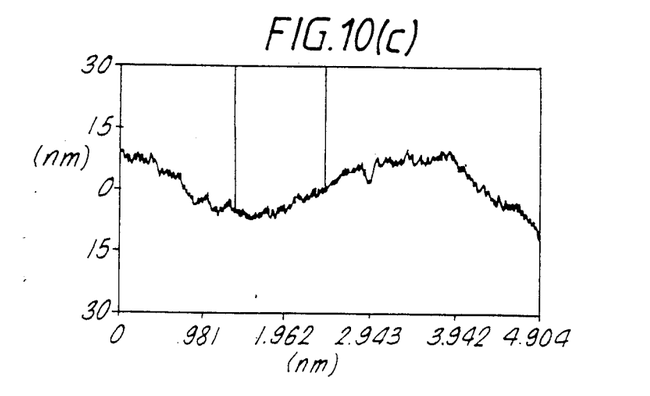
Figure 11:
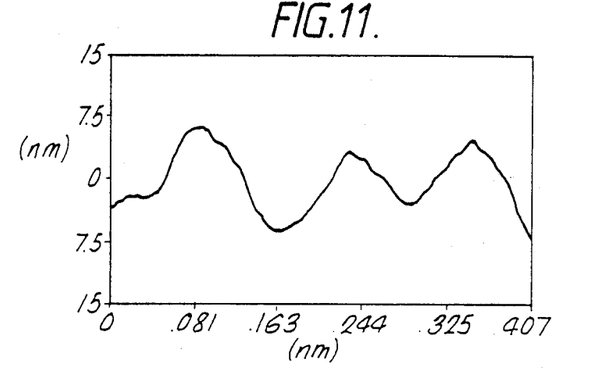
Figure 12:
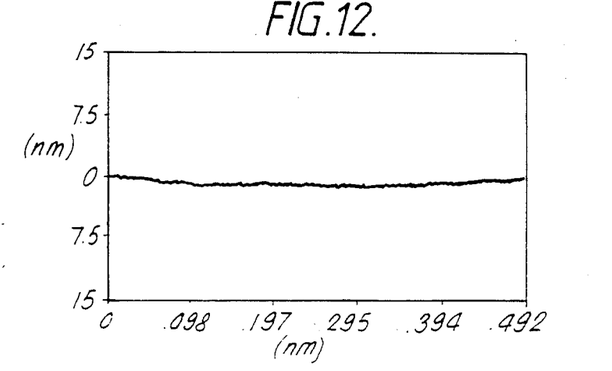

FIG. 10(a),(b) and (c) show measurements of a very thin oxide growth layer on a silicon wafer over sampling lengths of 0.05, 0.5 and 5 millimeters respectively. FIGS. 11 and 12 show traces of the surface features of two uncoated indium phosphide wafers. One (FIG. 11) had been polished by the conventional alcohol/bromine system, the other (FIG. 12) by a now wafer technology process.

Figure 1:
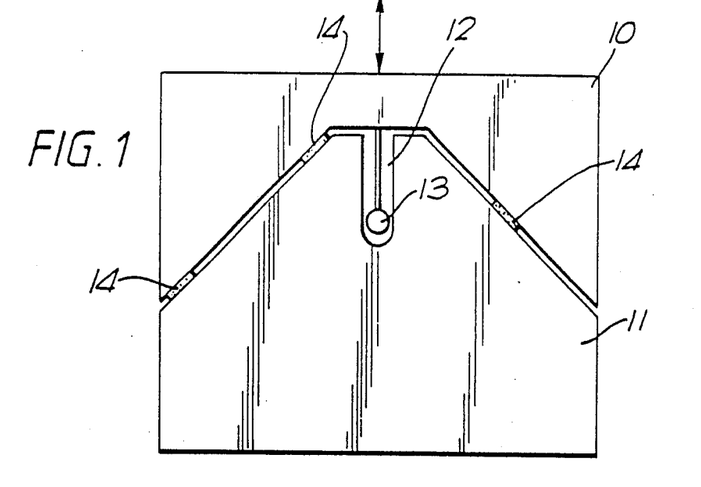
FIG. 1 is an elevation of a carriage and slide assembly according to the invention.
Figure 2:
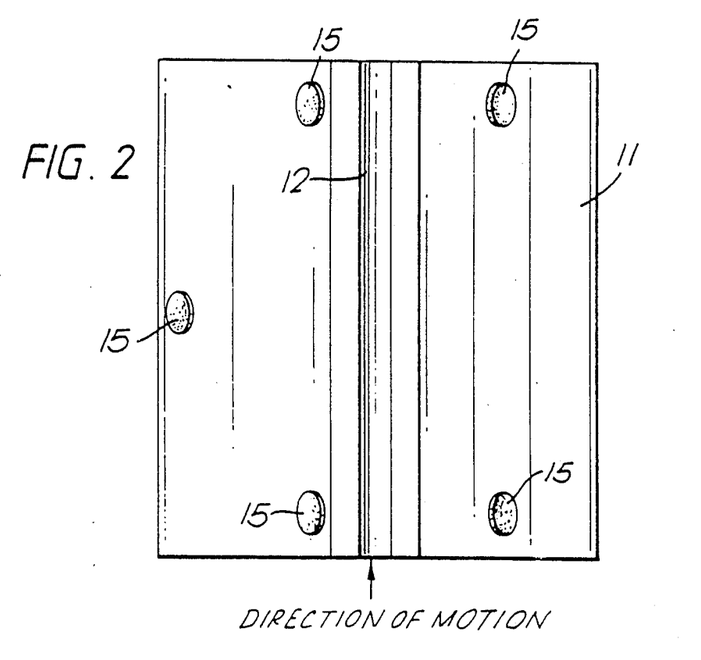
FIG. 2 is a plan view of the slide.

Alternative combinations of carriage 10 and slide 11 are shown in FIGS. 3 to 6, in which FIGS (a) are elevations, FIGS (b) are plan views, and in which the same identification numbers are used as in FIGS. 1 and 2.

Figure 3A:
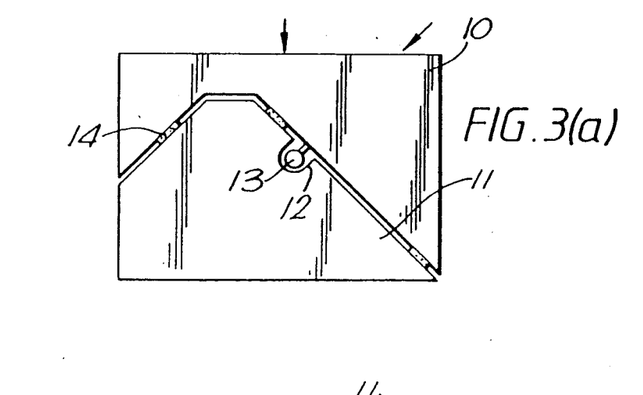
Figure 3B:
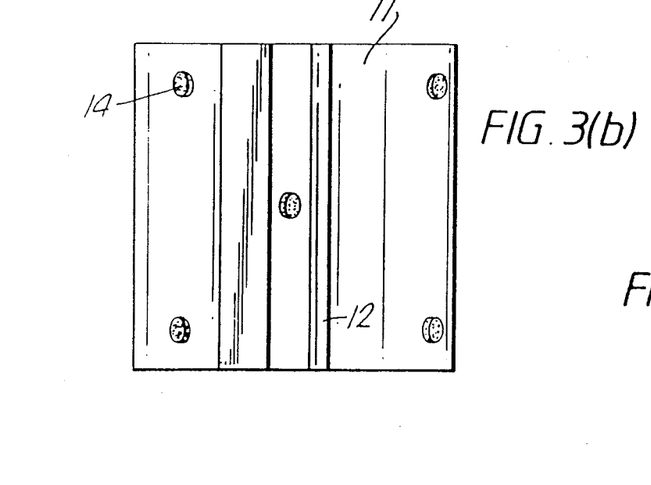
Figure 4A:
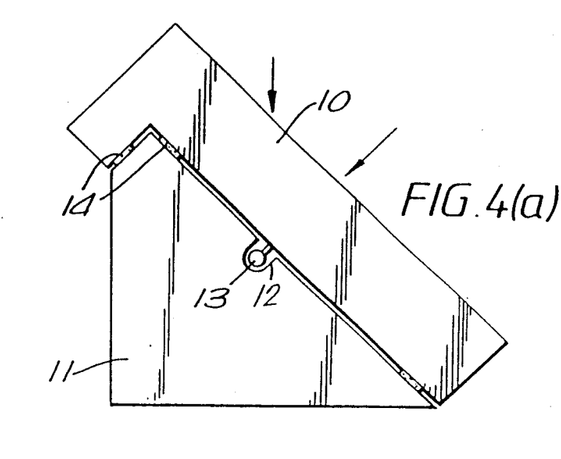
Figure 4B:
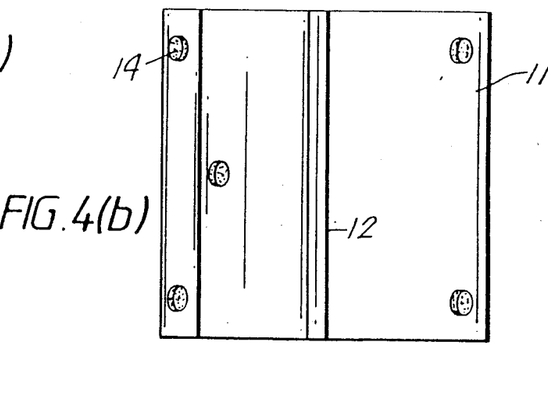
Figure 5A:
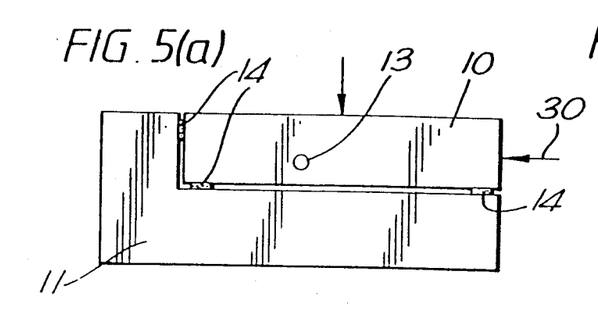
Figure 5B:
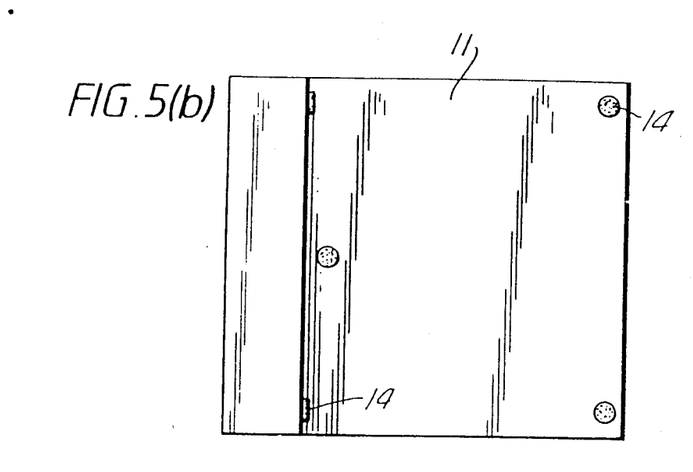

In the embodiment of FIG. 3 the slide 11 is of off-set prismatic form with the groove 12 positioned in the longer of the two sloping sides. The embodiment of FIGS. 4 has a slide 11 of triangular form with one face of the triangle truncated and the groove 12 in the untruncated arm. FIG. 5 show an embodiment wherein the slide 11 has an L-shaped form with the carriage 10 positioned in the L so as to effectively from a rectangle. In this embodiment the motive force is applied to a position 13(a) on the carriage 10. The embodiment of FIG. 6 has a slide 11 of rectangular form with a rectangular spine 111 extending upwardly therefrom and the carriage 10 having a channel 110 which encompasses the spine 111. The motive force is, as with the Embodiment of FIG. 5, applied to a position 13(a) on the carriage 10.

Figure 6A:
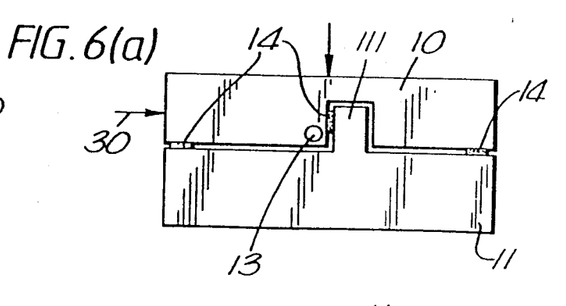
Figure 6B:
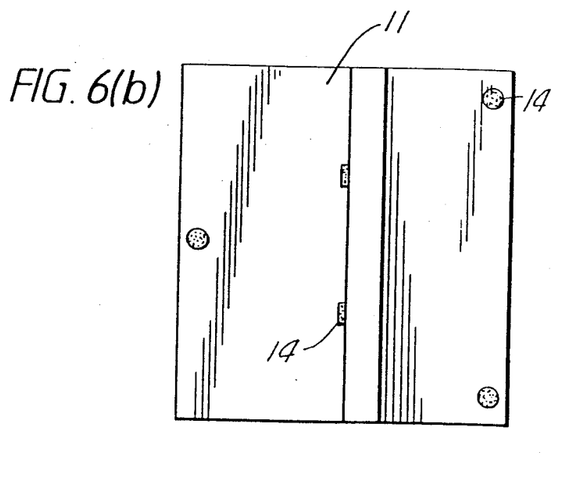

In each of the embodiments of FIGS. 5 and 6 two bearing pads (14) are positioned between vertically adjacent faces of slide and carriage and restraining means, as indicated at 30, are required to maintain contact of the pad 14 on the associated slide face. The embodiment of FIGS. 3 to 6 are arrangements well known in the art and operate in a manner similar to that of the embodiment described above with reference to FIGS. 1 and 2.

Figure 8:
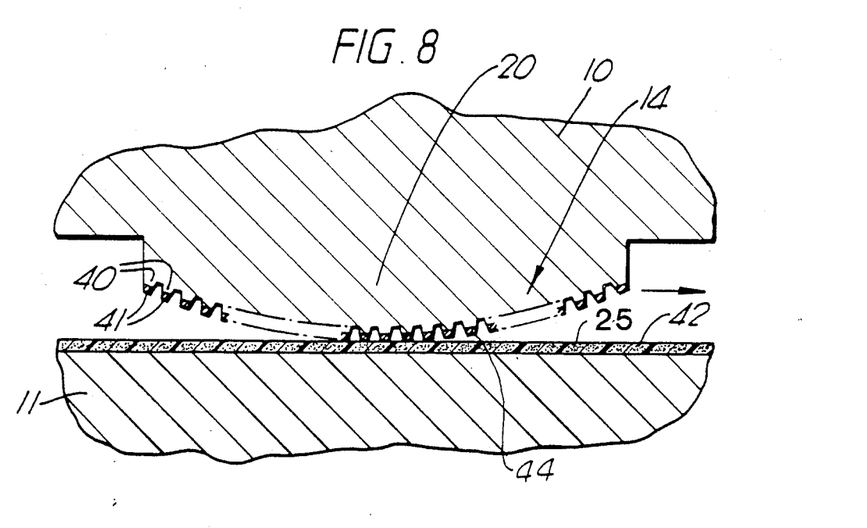
FIG. 8 is an elevation, in section, of another from of bearing pad according to the invention.

In an alternative form of bearing pad 14 (FIG. (8)) the backing 20 is formed integrally with the carriage 10, and the convex surface 24 is defined by a plurality of convex surfaces 44, preferably having a common radius, formed at the ends of protruberances 40 of, for example, square of circular section, each tipped with a thin layer 41 of polymeric material.

The thickness of the layers 22,41 and 23 of the polymeric material depends on the accuracy required form the instrument. For PTFE layers a total thickness across two contacting layers (22 and 23 or 41 and 23 for example) of 100 micrometers or more results in a difference between static and dynamic coefficients of friction of 20% or more. There are also fluctuations in the dynamic coefficient of friction of 10% or more. Moreover, on changing from the static to the sliding state there is a displacement, relative to the thickness, of 20 namometers or more. When the thickness has been reduced to 20 micrometers the difference in coefficients is down to about 10% with fluctuations in the dynamic coefficient of 1 to 2%. With a thickness of 2 to 3 micrometers both the differences between the two coefficients and the fluctuation in dynamic coefficient have been reduced to less than 1%, and the displacement on initiating movement reduced to the order of one nanometer. There is no detectable fluctuation of the displacement during movement, allowing test pieces mounted on a carriage to be measured to an accuracy of the order 0.05 nanometers. Where such a degree of accuracy is unnecessary, of course, a greater thickness can be used. Instruments giving improved accuracy of measurement over conventional instruments using roller or bulk PTFE bearings should, however, have a difference between the static and dynamic coefficients of friction no greater than 5%.

It has been found that kinematic restraint of the carriage 10 relative to the slide 11 is essential for motion accuracy. A geometrically ideal restraint would involve point mountings, but this is not practical. Each mounting, in the form of a bearing pad 14, is therefore expanded to provide a convex (preferably spherical but alternatively, for example, paraboloidal or ellipsoidal) bearing surface 24,44. In use each bearing surface 24,44 is locally compressed to form a contact area.

The practical limits or the radius of each bearing surface 24,44 are determined by the contact area. The upper limit is set by the stage at which geometrical imperfections in the surfaces 24,44 and layer 23, result in an inconsistency in interface contact position or area. The lower limit is set by the acceptable limit of interface stress (which tends to physically damage the layers 22, 41 and 23), and by the requirement that the contact area should be large enough to adequately average out the geometrical imperfections. For PTFE bearings of spherical shape and of the type described with reference to FIG. 7 these limits have been found to be 500 millimeters and 50 millimeter respectively. Changes in weight of the carriage 10 appropriate to instruments of this style have negligible effect on these limits.

Each layer 23 deposited on the slide 11 from a layer 22 of a pad 14 typically has a thickness of less than 5 nanometers. There is a consequent small change in the radius of the bearing surfaces 24,44 which might have to be allowed for in designing the pads 14. During the deposition process there is negligible overall loss of material. During subsequent operation of the instrument the thickness of the layers 22,41 and 23 remains substantially unchanged, counterface roughness being of the order of 0.5 nanometers Ra (as defined in BS 1134) giving a wear rate of less than $10^{-11}$ (10 nanometers of thickness per kilometer travelled). The upper limit for counterface roughness in an instrument according to the invention is 5 nanometers Ra. Because the loss of bearing material during running in and operation is so small, the material is, at least for the use described, substantially non-eroding.

It will be realised that there are many alternatives, within the scope of the invention, to some of the details described above. For example the backing 20 of the bearing pad 14 described with reference to FIG. 7 may be formed integrally with the carriage 10 or the backing 20 of the bearing pad 14 described with reference to FIG. 8 may be formed separately and then bonded to the carriage 10. An alternative method of finishing the surface layer 22, 41 to the desired radius and thickness is be diamond turning. The thin layer of non-eroding polymeric material may be deposited on the slide 11 directly rather than from pads 14, as illustrated at 42 in FIG. 8. The combined thickness of layers 41, 42 should be the same as that of layers 22, 23 to give the accuracies obtained with the instrument described with reference to FIGS. 1, 2 and 7.

It is well known in the Art that static and dynamic coefficients vary with conditions such as temperature and pressure. The above quoted radius relate to a particular PTFE material operated at temperatures and pressures at which mechanisms of the described type are conventionally used.

It will also be realised that whilst the mechanism described had PTFE as the substantially non-eroding polymeric substance, many other such substances can be expected to be equally effective. Examples are HDPE and UHMWPE.

In designing a machine according to the invention a polymeric substance should be selected which has a thin layer difference of coefficients of friction substantially less than the bulk difference at the planned operating conditions, and which is capable of providing a counterface having a roughness no greater than 5 nanometers Ra and preferably as low as 0.5 nanometers Ra. The combined thickness of the bearing pad and counterface layers (22, 23) which gives a difference in static and dynamic coefficients of friction and a reduced fluctuation in dynamic coefficient of friction appropriate to the required accuracy of instrument should then be established, usually by an empirical method. The limits of radius of curvature of the convex bearing pad surfaces 24, within which any variation of interface contact position or area and any inadequacy in averaging out geometrical imperfections are not too great to prevent the required accuracy from being attained, and within which interface stress remains acceptable, can then be established.

The plain bearing slide system has been described with reference to a five bearing straight line mechanism. However other mechanisms might be constrained to move on other accurately defined paths. For example a four bearing carriage might be mounted by four bearings on a cylindrical slide and constrained to follow, for example, a helical path.

It will also be realised that whilst a plain bearing slide system according to the invention has been described above, with reference to FIGS. 1 to 8, as used in a measuring instrument there are many other important uses for the invention; for example in precision machining of work-pieces, and in laser interferometers.

What is claimed is:

1. A plain bearing slide system including a carriage (10) mounted on a slide (11), the carriage (10) being kenematically constrainable to move along an accurately defined paath by means of bearing pads (14) between the carriage (10) and slide (11), characterised in that the surface of each bearing pad (14) is of convex shape, is coated with a thin layer (22, 41) of sybstantially non-eroding polymeric material having a convex surface (24), and is arranged to ride along a counterface in the form of a surface (25) of a thin layer (23, 42) of substantially non-eroding polymeric material, the combined thickness of the two layers (22, 23, 41, 42) of the substantially non-eroding polymeric material being such that the difference between the static and dynamic coefficients of friction is considerably less than the difference between the static and dynamic bulk coefficients of friction and that the fluctuation in dynamic coefficient of friction is correspondingly reduced.

2. A plain bearing slide system as claimed in claim 1 characterised in that the surface (24, 44) of the thin layer (22, 41) of material coating the bearing pads (14) is spherical.

3. A plain bearing slide system as claimed in claim 1 characterised in that the surface (24, 44) of the thin layer (22,41) of material is ellipsoidal or paraboloidal.

4. A plain bearing slide system as cliamed in claim 1 characterised in that the counterface (25) has a surface roughness no greater than 5 nanometers Ra.

5. A plain bearing slide system as claimed in claim 4 characterised in that the counterface (25) has a surface roughness no greater than 0.5 nanometers Ra.

6. A plain slide system as claimed in claim 1 characterised in that the difference in static and dynamic coefficients of friction is not greater than 25% of the difference between the static and dynamic bulk coefficients of friction.

7. A plain bearing slide system as claimed in claim 1 wherein the material providing each counterface (25) is deposited from the thin layer (22) of polymeric material on an associated bearing pad (14).

8. A plain bearing slide system as claimed in claim 7 wherein the layer (23) of material providing each conterface (25) is no greater than 5 nanometers thick.

9. A plain bearing slide system as claimed in claim 1 wherein the material providing each counterface (25) is separately deposited.

10. A plain bearing slide system as claimed in claim 1 characterised in that the radius of the convex surfaces (24, 44) of each bearing pad lies within limits such that, in use, any variation of interface contact position or area and any inadequacy in averaging out geometrical imperfectins are not too great to prevent attainment of an accuracy of measurement appropriate to the combined thickness of the two layers (22, 23, 41, 42), and within which interface stress remains within acceptable limits.

11. A plain bearing slide system as claimed in claim 1 characterised in that the substantially non-eroding polymeric material is polytetrafluoroethylene.

12. A plain bearing slide system as claimed in claim 11 characterised in that the difference between the static and dynamic coefficients of friction is not greater than 5%.

13. A plain bearing slide system as claimed in claim 11 wherein the radius of the convex surface (24) of each bearing pad (14) lies within the range of 50 to 500 millimeters.

14. A plain bearing slide system as claimed in claim 13 characterised in that the combined thickness of the two layers (22, 23; 41, 42) of material is no greater than 2 to 3 micrometers.

15. A plain bearing slide system as claimed in claim 14, characterised in that the radius of the convex surface (24) is of the order of 300 millimeters.

16. A plain bearing slide system as claimed in claim 11 characterised in that the difference in the static and dynamic coefficients of friction, and the fluctuation in dynamic coefficient of friction are both no greater than 1%.

17. A plain bearing slide system as claimed in claim 11 characterised in having a detectable fluctuation of displacement during movement of no greater than 0.05 nanometers.

18. A plain bearing slide system as claimed in claim 1 characterised in that the convex surface (24) of each bearing pad (14) is defined by a plurality of convex surfaces (44) at the ends of protruberances (40) each having a thin layer (41) of substantially non-eroding polymeric material thereon.

19. A plain bearing slide system as claimed in claim 1 characterised in that the substantially non-eroding polymeric material is polytetrafluoroethylene, high density polyethylene or ultra high molecular weight polyethylene.

20. A plain bearing slide system as claimed in claim 1 characterised in that each bearing pad (14) is secured to the carriage (10).

21. A plain bearing slide ystem as claimed in claim 20 characterised in that each bearing pad (14) is integral with the carriage (10).

22. A plain bearing slide system as claimed in claim 1 characterised in that each convex surface (14) is formed by machining the thin layer (22, 41) of material with a concave glass file.

23. A plain bearing slide system as claimed in claim 1 characterised in that each convex surface (24) is formed by machining the thin layer (22, 41) of material by diamond turning.

24. A plain bearing slide system as claimed in claim 1 characterised in having five bearing pads (14) and in being constrained to move in a straight line.

25. A plain bearing slide system as claimed in claim 1 characterised in having four bearing pads (14) and in having the carraige (10) mounted on a cylidrical slide.

26. A plain bearing slide system as claimed in claim 1 characterised in being adapted for use as a measuring instrument.

27. A plain bearing slide system as claimed in claim 1 characterised in being adapated for use in precision machining.

28. A plain bearing slide system as claimed in claim 1 for use in a laser interferometer.

29. A plain bearing slide system as claimed in claim 1 characterised in having a contact member (13) situated at the center of gravity of the carriage (10) and to which a force can be applied to more the carriage (10).

30. A plain bearing slide system as claimed in claim 29 characterised in that the contact member (13) is also situated at the center of inertia of the carriage (10).

31. A plain bearing slide system as claimed in claim 29 characterised in that the contact member (13) is also at the center of friction of the carriage (10) and slide (11) combination.

32. A process of constructing a plain bearing slide system having a carriage (10) mounted on a slide (11), the carriage being kinematically constrainable to move along an accurately defined path by means including bearing pads (14) between the darriage (10) and the slide (11), the system being characterised in having the surface of each pad (14) of convex shape, coated with a thin layer (22,41) of sybstantially non-eroding polymeric material, and arranged to ride along a counterface (25) on a thin layer (23,42) of substantially non-eroding material, the process being characterised in including the steps of;

selecting a polymeric substance which, at the planned operating conditions of the slide system, has a thin layer difference of static and dynamic coefficients of friction substantislly less than the bulk difference and a correspondingly reduced fluctuation in dynamic coefficient of friction, and which is capable of providing a counterface (25) having a roughness no greater than 5 nanometers Ra;

determining a combined thickness of the thin layers (22, 23; 41,42) which gives a reduced difference in coefficient of friction and a reduced fluctuation in dynamic coefficient of friction appropriate to the required accuracy of the instrument;

establishing limits of radius of curvature of a surface (24,44) of the thin layer (22,41) of each bearing pad (14) within which, in use, any variation of interface contact position or area and any inadequacy in averaging out geometrical imperfections are not too great to prevent the required accuracy from being attained, and within which interface stress remains within acceptable limits; and constructing the bearing pads (14), assembling the carriage (10), slide (11) and bearing pads (14) and adding the layer (23,42) of material to provide the counterface (25) for each bearing pad (14) such that the combined thickness of the thin layers (22, 23; 41, 42) is no greater than that which has been determined to give coefficient of friction characteristics appropriate to the desired accuracy.

* * * * *

UNITED STATES PATENT AND TRADEMARK OFFICE
CERTIFICATE OF CORRECTION

PATENT NO. : 4,944,606

DATED : July 31, 1990

INVENTOR(S) : Kevin Lindsey and Stuart T. Smith

It is certified that error appears in the above-identified patent and that said Letters Patent is hereby corrected as shown below:

On the title page:

After item [22] and in col. 1, line 3, the following should be inserted:

--This application is a continuation of PCT GB88/00296 filed April 15, 1988.--.

Item [30] the following should be deleted:

--"Apr. 16, 1987 [WO] PCT Int'l Appl. .......PCT/GB88/00296--.

Signed and Sealed this

Sixth Day of October, 1992

Attest:

DOUGLAS B. COMER

Attesting Officer        Acting Commissioner of Patents and Trademarks